Patented Feb. 6, 1951

2,540,675

UNITED STATES PATENT OFFICE 2,540,675

THIOPHENE CHLORINATION WITH IODINE CATALYST

Carl E. Johnson, Herbert C. Wohlers, and George M. Wagner, St. Louis, Mich., assignors to Michigan Chemical Corporation, St. Louis, Mich.

No Drawing. Application April 14, 1947,
Serial No. 741,410

11 Claims. (Cl. 260—329)

The present invention relates to a novel process for the substitutive chlorination of thiophene, and is more particularly concerned with the substitutive chlorination of thiophene in the presence of a catalytic amount of iodine.

It has previously been proposed to chlorinate thiophene by a number of procedures. Any particular mode which has been employed for the substitutive chlorination of the compound, however, has had the inherent disadvantage of producing a heterogeneous mixture of chlorothiophenes, from which the individual chemical compounds have been separable only with difficulty. This occurred, during any chlorination process previously available, because the tendency for addition to the double bonds and subsequent splitting out of chlorine or hydrogen chloride always hampered efficient directive substitution chlorination. In addition, many of the products of such a substitutive chlorination of thiophene as previously practiced have been of little or negligible value, inasmuch as they could not be separated from the mixture of reaction products at all. The present invention therefore concerns itself with a method for the effective directive substitutive chlorination of thiophene, whereby the percentage of chlorothiophene chemical individuals obtainable from the mixture of reaction products is greatly increased over that obtainable by any previously practiced methods for the chlorination of thiophene.

It is, therefore, an object of the present invention to provide a novel process for the substitutive chlorination of thiophene, whereby an increased proportion of chlorothiophenes may be procured as chemical individuals. Another object of the invention is the provision of a process for the chlorination of thiophene which is conducted in the presence of a catalytic amount of iodine. An additional object of the invention is the provision of such a process wherein the catalytic amount of iodine present in the reaction is below about $1 \times 10^{-1}$ mole per mole of the thiophene. A further object of the invention is the provision of a novel process for the chlorination of thiophene with a chlorinating agent selected from chlorine and sulfuryl chloride, and wherein the chlorination is conducted in the presence of a catalytic amount of iodine. Still a further object of the invention is the provision of a such process wherein a mixture of thiophene, chlorine, and sulfur dioxide is caused to react in the presence of a catalytic amount of iodine. An additional object of the present invention is to provide a novel process for the substitutive chlorination of thiophene, whereby an increase in substitution products of from 10 to 30 per cent is realized over that obtainable from the chlorination of the same compound in the absence of the iodine catalyst. A still further object of the invention is the provision of an improved process for the chlorination of thiophene to produce 2-chlorothiophene and 2,5-dichlorothiophene. Other objects of the invention will become apparent hereinafter.

It has now been found that the objects of the present invention may be accomplished and exceptionally high yields of chlorothiophene individuals produced in yields as high as 35 per cent greater than those obtainable by processes previously available for the chlorination of thiophene, by employing a catalytic amount of iodine within the zone of reaction between the thiophene and a chlorinating agent selected from gaseous chlorine and sulfuryl chloride. The inclusion of the iodine catalyst within the reaction zone is an essential requirement in carrying out the new process, as it is the catalytic effect of the iodine which increases the directive substitution reaction and allows production of the enhanced proportions of chlorothiophene chemical individuals.

The process of the present invention essentially comprises reaction of a chlorinating agent selected from free chlorine or sulfuryl chloride, with thiophene, while the thiophene is in the liquid phase.

Chlorinating agents which may be employed in carrying out the method of the present invention are gaseous chlorine or sulfuryl chloride. If chlorine is employed in the process, it may be used alone or in admixture with sulfur dioxide, or it may be passed into the liquid thiophene containing dissolved therein a proportion of sulfur dioxide, e. g., from about 0.6 to about 4 moles of sulfur dioxide per mole of thiophene being treated. When it is desired to produce monochlorothiophenes, it is usually desirable to employ a molar ratio of chlorinating agent to thiophene between about 0.5 and .75 to 1. When it is desired to obtain predominantly disubstituted products, such as the 2,5-dichlorothiophene, it is usually desirable to employ a ratio between about .75 to 2.0 moles of chlorinating agent, i. e., the chlorine or sulfuryl chloride, to each mole of thiophene. Although the above ratios represent the preferred overall ranges for the accomplishment of the objectives of the present invention, it is to be understood that a much wider range may be employed without materially detracting from the advantages accruing to employment of the new process.

The temperature under which the new process is conducted should be such as to maintain the thiophene in the liquid phase and depends considerably on the exact procedure employed. With chlorine as the active chlorinating agent, the reaction is conducted at above 50 degrees centigrade and preferably at about reflux temperature, i. e., usually between about 75 and 85 degrees centigrade. When sulfur dioxide is employed in admixtures with the starting thiophene and chlorine introduced thereinto, the preferred operating temperature for the chlorination is somewhat lower, e. g., between about −10 and 30 degrees centigrade. With sulfuryl chloride, however, any temperature between about −20 and 85 degrees centigrade is operative for production of high yields of desired compound. Although a temperature within the above ranges is preferable, temperatures not considerably higher or lower may be employed without detracting materially from the advantages of the invention.

An essential feature of the invention is the inclusion within the chlorination zone of a small amount of iodine catalyst. It has been found that the objects of the present invention may be accomplished when operating according to the procedure outlined herein only in the event that a catalytic amount of iodine be present in the zone of reaction between the thiophene and the chlorinating agent employed. The requisite amount of iodine catalyst may be varied over a somewhat specific range, and, for the purposes of this invention, is any amount between about traces and about $1 \times 10^{-1}$ mole per mole of thiophene being chlorinated. The iodine is preferably present in an amount up to about $1 \times 10^{-3}$ mole for each mole of thiophene. Above the upper limit of $1 \times 10^{-1}$ mole of iodine per mole of thiophene being chlorinated, disruption of the thiophene molecule is substantially increased and becomes unfavorably great for the accomplishment of the objects herein set forth.

While the present invention, in its broader sense, is generally applicable for the directive substitutive chlorination of thiophene, the preferred embodiment of the invention is in its application to the chlorination of thiophene to produce 2-chlorothiophene and 2,5-dichlorothiophene, in which instances the mole ratios of chlorinating agent to the thiophene are usually between about 0.5 and .75 mole to one and from .75 to 2.0 moles to one, respectively. When operating within these preferred ranges, the yields of above-identified desired substitution products are especially gratifying.

The following examples are given to illustrate the process of the present invention, but are in no way to be construed as limiting.

*Example 1*

Seven moles of thiophene, containing $4.8 \times 10^{-3}$ moles of iodine dissolved therein for each mole of thiophene, was maintained at about reflux temperature (about 80 degrees centigrade) in a glass-lined reaction vessel fitted with a reflux condenser, chlorine inlet tube located near the bottom of the vessel, and an outlet for discharging reaction products. Chlorine was bubbled into the mixture through the inlet tube over a period of about 3.75 hours, the total chlorine introduced being about 4.20 moles. The amount of hydrogen chloride evolved during the reaction was 4.11 moles.

At the end of the reaction period, the products were exhausted from the reaction vessel and found to contain 3.18 moles of unreacted thiophene, 3.0 moles of 2-chlorothiophene, and 0.63 mole of 2,5-dichlorothiophene. The efficiency of the process, on a basis of the 2-chlorothiophene produced, was 78.5 and 71.4 per cent of the theoretical, calculated on a basis of the thiophene consumed and chlorine introduced, respectively.

*Example 2*

In the same manner as that given in Example 1, 7.0 moles of thiophene, containing $1.12 \times 10^{-3}$ moles of iodine dissolved therein for each mole of thiophene, was maintained at about reflux temperature and 4.20 moles of chlorine bubbled slowly thereinto over a period of about 3.8 hours. The amount of hydrogen chloride scrubbed from the gaseous reaction products was 3.97 moles. Upon fractionation, the product was found to include 3.24 moles of unreacted thiophene, 2.94 moles of 2-chlorothiophene, and 0.60 mole of 2,5-dichlorothiophene. The efficiency of the process, on a basis of the 2-chlorothiophene produced, was 78.2 per cent and 70.0 per cent of the theoretical, the calculations being on a basis of the thiophene consumed and chlorine introduced, respectively.

*Example 3*

In the same manner as that given above, 7.0 moles of thiophene, containing $1.03 \times 10^{-4}$ moles of iodine dissolved therein for each mole of thiophene, was maintained at about reflux temperature and 4.20 moles of chlorine bubbled thereinto over a period of about 5.5 hours. Hydrogen chloride was scrubbed from gaseous reaction products in the amount of 4.01 moles. From the mixture of reaction products were separated 3.11 moles of unreacted thiophene, 3.03 moles of 2-chlorothiophene, and 0.41 mole of 2,5-dichlorothiophene. The efficiency of the process, when calculated on a basis of the 2-chlorothiophene produced, was 77.7 and 71.6 per cent of the theoretical, respectively, on a basis of the thiophene consumed and chlorine introduced.

*Example 4*

In the same manner as that given in Example 1, 7.0 moles of thiophene, containing $1 \times 10^{-3}$ moles of iodine dissolved therein for each mole of thiophene, and in addition containing about 12.5 moles of sulfur dioxide dissolved therein, was maintained at a temperature of about −5 degrees centigrade while 4.2 moles of chlorine was bubbled thereinto over a period of about 3.8 hours. Upon rectification of the mixture of reaction products, 3.12 moles of unreacted thiophene, 3.04 moles of 2-chlorothiophene, and 0.47 mole of 2,5-dichlorothiophene were obtained. The efficiency of the reaction, on a basis of the 2-chlorothiophene produced, was 78.3 per cent of theory, calculated on the converted thiophene, and 72.4 per cent on a basis of the chlorine introduced.

*Example 5*

In apparatus similar to that described in Example 1, 7.0 moles of thiophene, containing $1 \times 10^{-3}$ moles of iodine dissolved therein for each mole of thiophene, was maintained at a temperature of about 30 degrees centigrade over a period of about 6.0 hours while 4.20 moles of sulfuryl chloride ($SO_2Cl_2$) was added dropwise thereto. Hydrogen chloride in the amount of 3.7 moles was evolved from the reaction mixture. The mixture of reaction products, upon rectification, was found to contain 2.66 moles of unreacted thiophene, 3.20 moles of 2-chlorothiophene, and 0.41 mole of 2,5-dichlorothiophene. The efficiency of the reaction, determined from the 2-chlorothiophene produced, was 73.7 per cent of the theoretical when calculated on a basis of the thiophene consumed, and 76.1 per cent on a basis of the sulfuryl chloride introduced.

As various modifications may be made in the method of the invention without departing from the spirit or scope thereof, it is to be understood that we limit ourselves only as defined in the appended claims.

We claim:

1. The process which includes: mixing liquid thiophene and a chlorinating agent, selected from gaseous chlorine and sulfuryl chloride, in the presence of a catalytic amount of iodine, the iodine being present in an amount less than about $1 \times 10^{-1}$ mole per mole of thiophene, and the molar ratio of chlorinating agent to thiophene being below about 2.0 moles to 1.

2. The process of claim 1, wherein the iodine is present in an amount less than about $1 \times 10^{-3}$ mole per mole of thiophene.

3. The process of claim 1, wherein the molar ratio of chlorinating agent to thiophene is below about 1 mole to 1.

4. The process of claim 1, wherein the active chlorinating agent is sulfuryl chloride.

5. The process which includes: mixing liquid thiophene and gaseous chlorine in the presence of a catalytic amount of iodine, the iodine being present in an amount less than about $1 \times 10^{-1}$ mole per mole of thiophene, and the molar ratio of chlorine to thiophene being below about 2.0 moles to 1.

6. The process of claim 5, wherein the temperature is maintained between about 50 degrees centigrade and about reflux temperature.

7. The process of claim 5, wherein the temperature is maintained at about reflux temperature.

8. The process of claim 5, wherein gaseous chlorine is passed into the liquid thiophene.

9. The process of claim 5, wherein the thiophene contains dissolved therein sulfur dioxide in an amount up to about 4 moles per mole of the thiophene.

10. The process of claim 5, wherein a mixture of chlorine and sulfur dioxide is passed into the liquid thiophene.

11. The process of claim 5, wherein the molar ratio of chlorine to thiophene is below about 1 mole to 1.

CARL E. JOHNSON.
HERBERT C. WOHLERS.
GEORGE M. WAGNER.

REFERENCES CITED

The following references are of record in the file of this patent:

UNITED STATES PATENTS

| Number | Name | Date |
|---|---|---|
| 1,946,040 | Stoesser | Feb. 6, 1934 |
| 2,504,084 | Norris | Apr. 11, 1950 |

OTHER REFERENCES

Groggins: "Unit Processes in Organic Synthesis," Ed. 2. 1938, pages 183, 184. McGraw-Hill, N. Y.

Richter: "Organic Chemistry," pages 649, 650. John Wiley, N. Y. 1938.

Steinkopf: "Die Chemie des Thiophens," 1941, pages 45 and 44. Edwards, Lithoprint.